(12) United States Patent
Uenver et al.

(10) Patent No.: US 8,590,659 B2
(45) Date of Patent: Nov. 26, 2013

(54) APPARATUS FOR PROTECTING FEET

(75) Inventors: Gevriye Uenver, Frankfurt (DE);
Alejandro Guardia, Ingolstadt (DE);
Karl Koschdon, Wiesbaden (DE); Bert Wrobel, Undenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 101 days.

(21) Appl. No.: 13/116,154

(22) Filed: May 26, 2011

(65) Prior Publication Data
US 2011/0290068 A1 Dec. 1, 2011

(30) Foreign Application Priority Data
May 26, 2010 (DE) .......................... 10 2010 021 569

(51) Int. Cl.
*G05G 1/14* (2006.01)
(52) U.S. Cl.
USPC .......................................................... 180/274
(58) Field of Classification Search
USPC ........................................................ 180/274
IPC ......................................................... G05G 1/14
See application file for complete search history.

(56) References Cited

U.S. PATENT DOCUMENTS

| | | | |
|---|---|---|---|
| 8,100,033 B2* | 1/2012 | Hasegawa et al. ............... | 74/512 |
| 8,196,695 B2* | 6/2012 | Kim et al. ..................... | 180/274 |
| 2001/0006010 A1* | 7/2001 | Choi ................................ | 74/512 |
| 2003/0084744 A1 | 5/2003 | Parenteau et al. | |
| 2003/0094070 A1 | 5/2003 | O'Neill | |
| 2004/0074689 A1* | 4/2004 | Baylis et al. .................... | 180/274 |
| 2009/0025506 A1* | 1/2009 | Karpachev ...................... | 74/513 |

FOREIGN PATENT DOCUMENTS

| | | |
|---|---|---|
| DE | 29821632 U1 | 4/1999 |
| DE | 19916810 A1 | 10/2000 |
| DE | 19921141 A1 | 12/2000 |
| DE | 20114485 U1 | 10/2001 |
| DE | 10261048 A1 | 7/2004 |
| DE | 10347845 A1 | 5/2005 |
| FR | 2946002 A1 | 12/2010 |
| WO | 2010146271 A1 | 12/2010 |

OTHER PUBLICATIONS

German Patent Office, German Search Report for German Application No. 102010021569.4, dated Dec. 28, 2010.
UK IPO, British Search Report issued in Application No. 1108194.0, dated Sep. 9, 2011.

* cited by examiner

*Primary Examiner* — Nicole Verley
(74) *Attorney, Agent, or Firm* — Ingrassia Fisher & Lorenz, P.C.

(57) ABSTRACT

An automobile having pedals in the footwell, including, but not limited to at least one apparatus for protection of the lower extremities of the driver or this automobile. The apparatus includes, but is not limited to a deflector plate and at least one fastening element, which is connected to the deflector plate and which serves for fastening the apparatus in the footwell of the automobile, and the apparatus is disposed in the footwell of the automobile in such a manner between two pedals that a foot resting on one of the pedals cannot get behind the pedals if it slips from the pedal in the event of an accident.

20 Claims, 4 Drawing Sheets

APPARATUS FOR PROTECTING FEET

CROSS-REFERENCE TO RELATED APPLICATION

This application claims priority to German Patent Application No. 102010021569.4, filed May 26, 2010, which is incorporated herein by reference in its entirety.

TECHNICAL FIELD

The technical field relates to an apparatus for protecting the lower extremities of the driver of an automobile having pedals in the footwell.

BACKGROUND

It is known that the lower extremities of the drivers of automobiles are exposed to high accelerations when an accident occurs. At the same time, the feet, which usually rest on a pedal when driving the automobile can slip between the pedals and get behind the pedals. In the case of a severe impact, the so-called bulkhead, which delimits the footwell of the passenger compartment from the engine compartment and adjoins the vehicle floor, can additionally be pressed into the passenger compartment.

In order to avoid injuries, DE 298 21 632 U1 proposed a cover, which extends at least partially over the pedals in normal driving operation so that on the one hand, it is possible to fully depress the pedals and on the other hand, shifting of the feet behind the pedals is prevented. The apparatus comprises a flexible membrane covering the pedals, which can have protruding tread surfaces, which upon fully depressing the pedals come to rest on pedal tread plates behind the cover. The cover can be configured to be inflatable and it can be removably accommodated in the vehicle. It can be considered to be a disadvantage of a membrane covering the pedals of a motor vehicle that the membrane ruptures due to the permanent mechanical loading and consequently can no longer fulfill its function.

It was therefore at least one object to provide an alternative apparatus, by which means injuries to the lower extremities of the driver, for example, the foot, ankle, and/or lower leg by the pedals in the automobile in the event of an accident can be avoided. In addition, other objects, desirable features and characteristics will become apparent from the subsequent summary and detailed description, and the appended claims, taken in conjunction with the accompanying drawings and this background.

SUMMARY

The at least one object is achieved in a surprisingly simple manner by an apparatus, which can be disposed in the footwell of the automobile in the area of the pedals and which deflects the foot slipping away from the pedal in the event of an accident such that it cannot get behind the pedals.

The apparatus comprises a deflector plate, which, in the event of an accident, prevents the foot resting on the pedal from slipping between the pedals and becoming wedged behind the pedals, by deflecting the foot slipping from the pedal. In this way, when slipping from the pedal, the foot of the driver is guided in such a manner that it cannot get between two pedals and slip behind the pedals.

The deflector plate can be straight, bent, or curved in order to be fitted optimally in the space available between two pedals. In one embodiment, the deflector plate has a concave curvature. With this shaping of the deflector plate, the foot is least impeded during a pedal change.

The contour of the deflector plate and its dimensions are preferably selected so that it will not impede the actuation of the pedals and a change of the foot from one pedal to the neighboring pedal. For this purpose the gaps between deflector plate and pedals should be as small as possible, in any case sufficiently narrow that a foot cannot get stuck in the gap.

The apparatus can be fastened to the vehicle body, preferably to the bulkhead in an area between two pedals, or on the pedal support. For fastening the apparatus to the vehicle, the apparatus has a fastening element, which is connected to the deflector plate. The fastening element preferably comprises a tubular element, which at the end not attached to the deflector plate, is provided for example with an internal thread or a plate which has a hole at the center.

The apparatus can be fastened to the vehicle by means of a screw, which can be twisted from the free end of the fastening element into the internal thread of the fastening element or the thread whereof projects through the plate from the fastening element and the head whereof is held by the plate in the fastening element.

However, other fastening possibilities can also be used for fastening the apparatus on the vehicle by differently configured fastening elements.

In a further and/or additional configuration, the apparatus has at least one centering element, which is connected to the deflector plate and with the aid of which the apparatus can be aligned and held in position during its fastening to the vehicle. The centering element preferably comprises a tubular element which at the end not attached to the deflector plate, is provided for example with an internal thread or a plate having a central hole.

The apparatus can be centered on the vehicle by means of a screw, which can be twisted from the free end of the centering element into the internal thread of the centering element or the thread whereof projects through the plate from the centering element and the head whereof is held by the plate in the centering element. To be centered means that the apparatus can be fastened on the vehicle in such a manner that the deflector plate is fitted optimally between two pedals and any adjustment, slippage, twisting, or shifting of the apparatus fastened on the vehicle is avoided.

Alternatively, the centering element can comprise a plug and socket device or a snap-in locking device, which can be plugged or engage in suitably shaped receptacles or grooves on the vehicle.

In one embodiment, the apparatus comprises at least one stiffening or reinforcing element. Preferred stiffening elements are ribs, which are disposed substantially perpendicular to the plane of the deflector plate and which extend between the rear side of the deflector plate and the fastening element and/or the centering element.

In one embodiment, the apparatus comprises at least one clamping element, preferably in the form of a clasp-shaped element. With the clamping element or the clamping elements, the apparatus can be fastened, for example to the holder for the pedal arm. The stability of the apparatus in the built-in state can be improved through this additional fastening possibility.

The apparatus preferably comprises an injection-molded part of plastic. The apparatus can, however, also be made of metal, preferably a light metal.

An automobile is provided having pedals in the footwell, which have at least one of the apparatus for protecting the lower extremities of the driver. An automobile having pedals in the footwell, comprising at least one apparatus for protection of the lower extremities of the driver of this automobile, wherein the apparatus comprises a deflector plate and at least one fastening element, which is connected to the deflector plate and which serves for fastening the apparatus in the footwell of the automobile, and the apparatus is disposed in the footwell of the automobile in such a manner between two pedals that a foot resting on one of the pedals cannot get behind the pedals if it slips from the pedal in the event of an accident.

In specific embodiments of the automobile, the fastening element of the apparatus is tubular and at its end which is not attached to the deflector plate, is provided with an internal thread or a plate which has a hole at the center. In specific embodiments of the automobile, the apparatus additionally has at least one centering element. In specific embodiments of the automobile, the centering element is tubular and at its end which is not attached to the deflector plate, is provided with an internal thread or a plate which has a hole at the center. In specific embodiments of the automobile, the apparatus additionally has at least one stiffening element.

In specific embodiments of the automobile, the stiffening element is configured in the form of a rib, which extends between the rear side of the deflector plate and the fastening element and/or the centering element. In specific embodiments of the automobile, the apparatus comprises at least one clamping element. In specific embodiments of the automobile, the apparatus comprises an injection-molded part.

In preferred embodiments of the automobile, the apparatus is fastened on the bulkhead or the pedal holder. In embodiments of the automobile, the apparatus is fastened and positioned between two pedals in such a manner that the deflector plate covers the intermediate space between the pedal arms of neighboring pedals.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
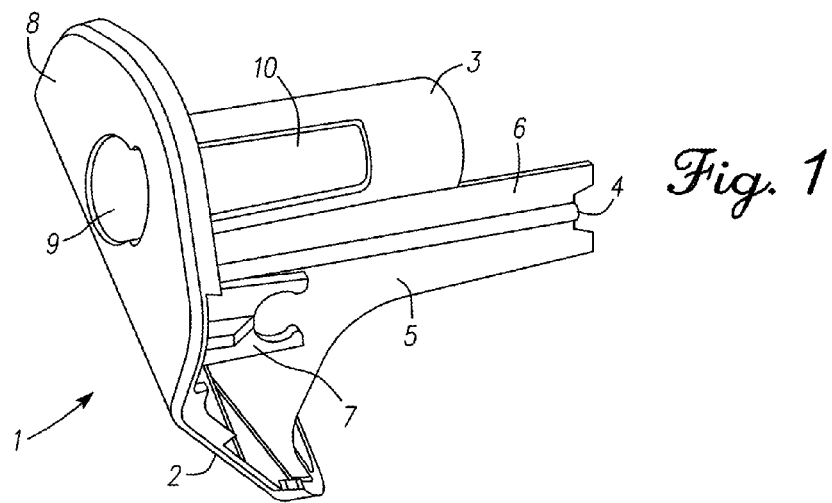
FIG. 1 shows a schematic view of a preferred embodiment of the apparatus.

FIG. 1 shows a schematic view of a preferred embodiment of the apparatus 1 for protection of the lower extremities of a driver of automobiles. The apparatus 1 comprises a deflector plate 2 and a tubular fastening element 3. The apparatus further comprises a centering element 4, a first reinforcing element 5, and a second reinforcing element 6. In addition, the apparatus 1 comprises a clamping element 7, which is configured as a clip or clasp.

In the embodiment shown the deflector plate 2 is bent in such a manner that it can be divided into a lower region pointing away from the foot of the driver and an upper region 8 serving to fasten the apparatus on the vehicle. In its upper region 8 the deflector plate 2 has a passage or opening 9, through which, for example, a screw can be guided into the tubular fastening element. In the embodiment of the apparatus shown, the fastening element 3 has a passage or opening 10 in its wall. The passage or opening 10 facilitates the mounting of the apparatus 1 in the vehicle, since for example, the apparatus can be screwed in while monitoring visually. The apparatus 1 has a centering element 4, which can be connected to the vehicle. The centering element is configured as a narrow, tubular element into which a screw can be twisted.

The first reinforcing element 5 is configured in the form of a rib, which extends perpendicularly to the plane of the upper region 8 of the deflector plate 2 and connects the rear side of the deflector plate 2 to the centering element 4. In the embodiment shown, the second stiffening element 6 extends between the fastening element 3 and the centering element 4 perpendicular to the plane of the upper region 8 of the deflector plate 2.

Figure 2:
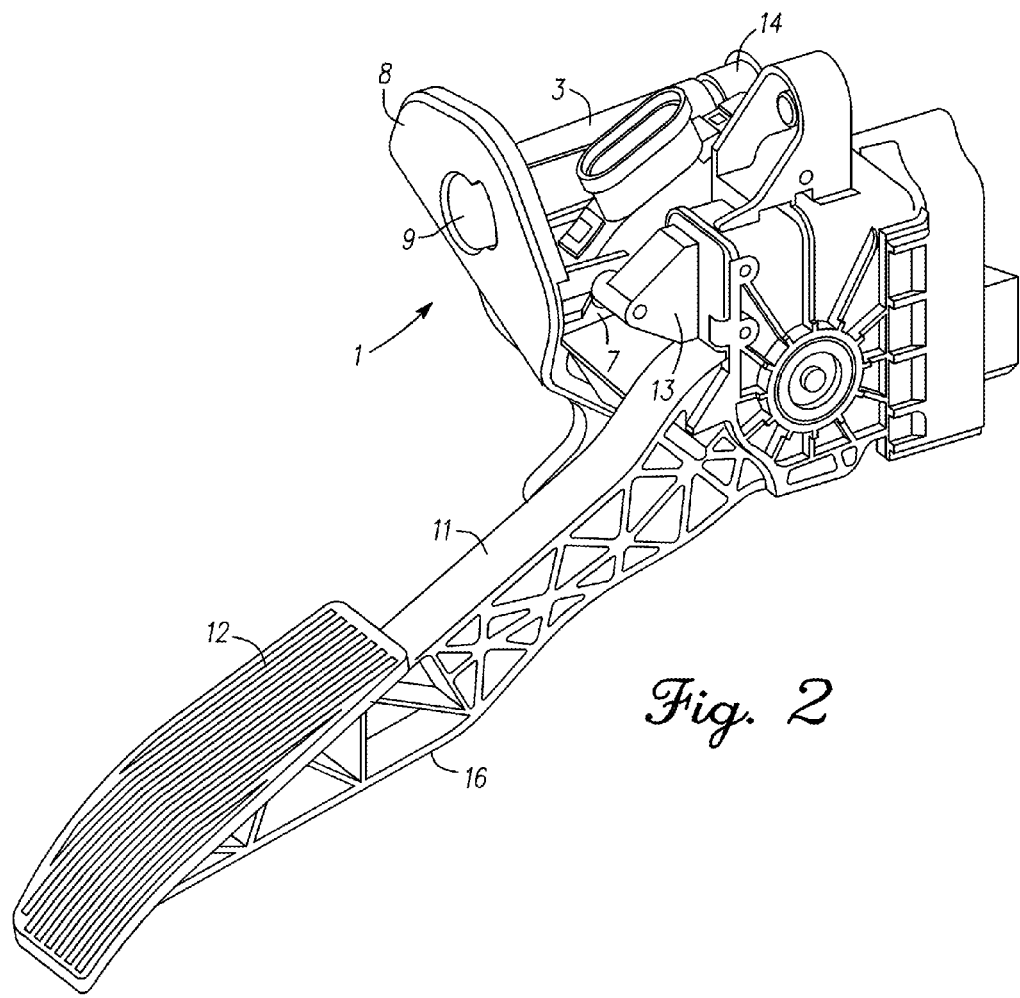
FIG. 2 shows a schematic view of a pedal with an embodiment of the apparatus in position after fastening.

FIG. 2 illustrates how the apparatus 1 is disposed on a vehicle at the side of a gas pedal comprising a pedal arm 11 and a pedal surface 12. The apparatus 1 is screwed to the pedal support 14 via its fastening element 3. In addition, the apparatus 1 is connected to a component 13 of the pedal support 14 by means of the clamping device 7.

Figure 3:
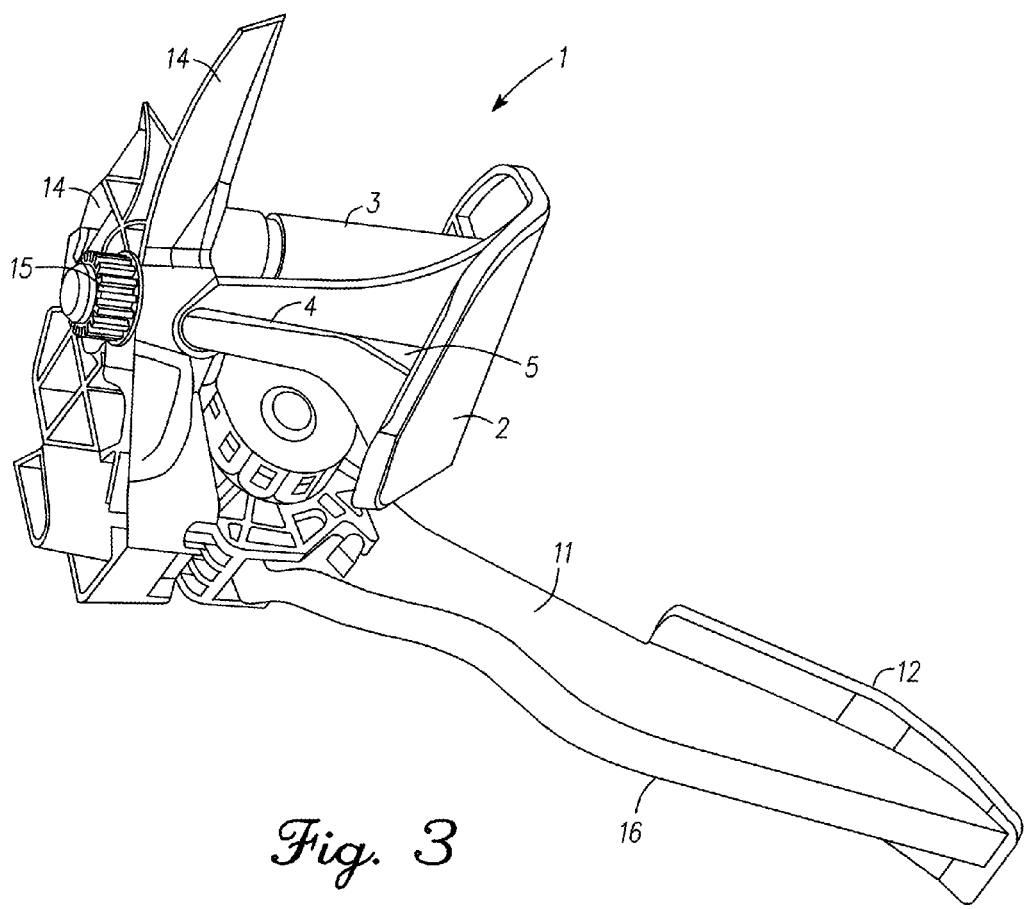
FIG. 3 shows a schematic view of a pedal with an embodiment of the apparatus in position after fastening.

FIG. 3 shows the arrangement depicted in FIG. 2 in a different perspective. This shows the pedal support 14 with a gas pedal comprising a pedal arm 11 and a pedal surface 12. Also shown is the apparatus 1 comprising a fastening element 3, a centering element 4, and a first reinforcing element 5. The apparatus 1 is positioned to the side of the pedal arm 11 by means of a screw 15, which is screwed through the pedal support 14 into the centering element 4 of the apparatus 1.

Figure 4:
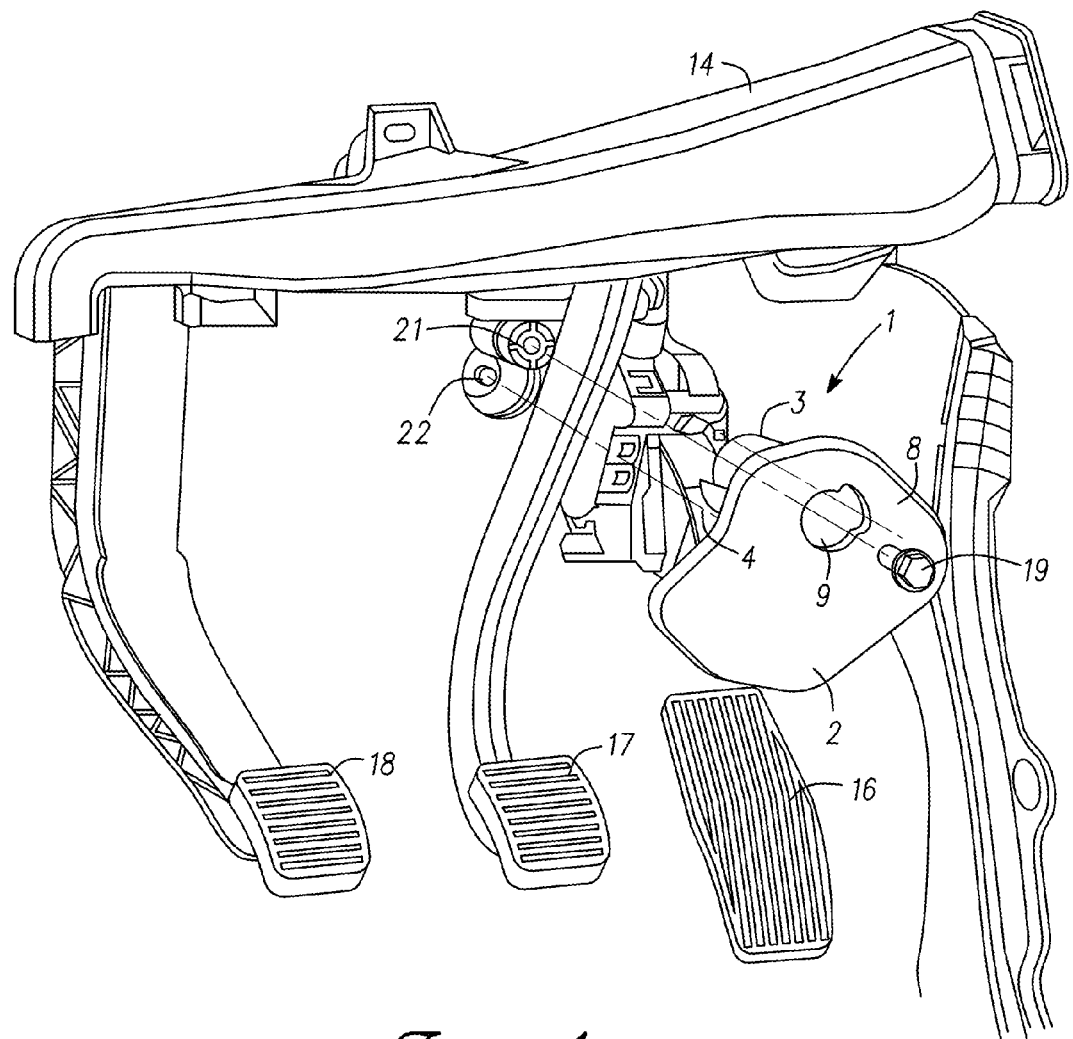
FIG. 4 shows a schematic view of the pedals of an automobile with apparatus not yet fastened.

FIG. 4 shows a pedal arrangement of an automobile comprising gas pedal 16, brake pedal 17, and clutch pedal 18, which are disposed on a pedal support 14. The apparatus 1 can be fastened to a fastening device 21 on the pedal support 14 by means of a fastening screw 19, which is guided through the opening 9 into the tubular fastening element 21 and can be positioned by means of the centering element 4, a centering device 22 on the pedal support 14 between gas pedal 16 and brake pedal 17.

Figure 5:
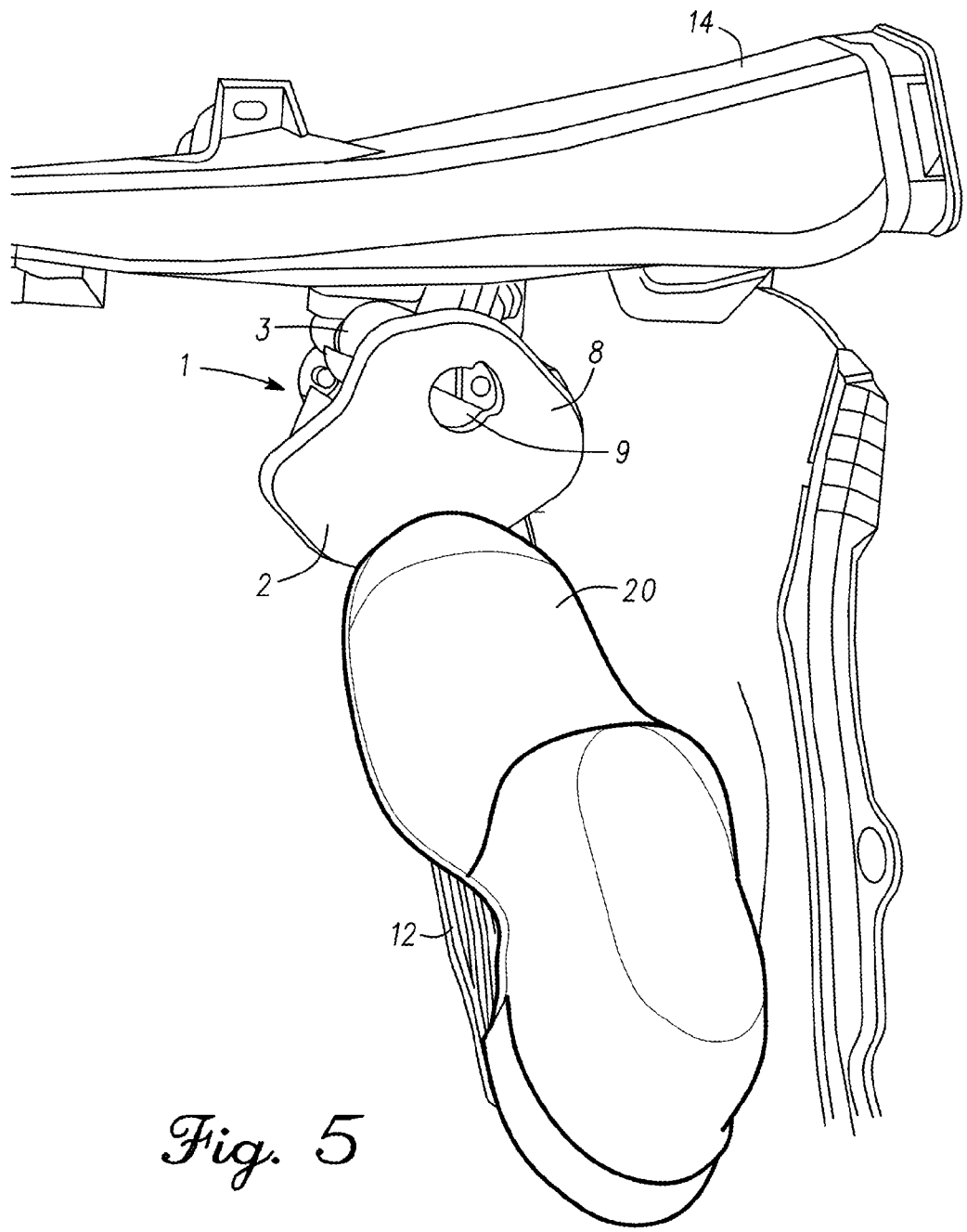
FIG. 5 shows a schematic view of a pedal with an embodiment of the apparatus in position after fastening.

FIG. 5 shows the apparatus 1 in the mounted state and illustrates how the apparatus can avoid any slippage of the foot 20 behind the pedals.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An apparatus for protection of a lower extremity of a driver in an automobile having two pedals in a footwell, comprising:
   a deflector plate; and a fastening element connected to the deflector plate that is configured to fasten the apparatus in the footwell of the automobile, wherein the apparatus is disposable in the footwell of the automobile entirely between the two pedals such that a foot resting on one of the two pedals is inhibited from a position behind the two pedals if the foot slips in an event of an accident.

2. The apparatus according to claim 1, wherein the fastening element is tubular and at an end that is not attached to the deflector plate, an internal thread is provided having a substantially centered hole.

3. The apparatus according to claim 1, wherein the fastening element is tubular and at an end that is not attached to the deflector plate, a plate is provided having a substantially centered hole.

4. The apparatus according to claim 1, further comprising a centering element.

5. The apparatus according to claim 4, wherein the centering element is tubular and at an end that is not attached to the deflector plate, an internal thread is provided having a substantially centered hole.

6. The apparatus according to claim 1, further comprising a stiffening element.

7. The apparatus according to claim 6, wherein the stiffening element is a rib that extends between a rear side of the deflector plate and the fastening element.

8. The apparatus according to claim 1, further comprising a clamping element.

9. The apparatus according to claim 1, further comprising an injection-molded part.

10. The apparatus according to claim 1, wherein the apparatus is fastened on a bulkhead.

11. The apparatus according to claim 1, wherein the apparatus is fastened on a pedal holder.

12. The apparatus according to claim 1, wherein the apparatus is fastened and positioned between the two pedals in such a manner that the deflector plate substantially covers an intermediate space between pedal arms of neighboring pedals.

13. An apparatus for protection of a lower extremity of a driver in an automobile having two pedals in a footwell, comprising:

a deflector plate; and a fastening element connected to the deflector plate that is configured to fasten the apparatus in the footwell of the automobile, wherein the fastening element is tubular, and wherein the apparatus is disposable in the footwell of the automobile between the two pedals such that a foot resting on one of the two pedals is inhibited from a position behind the two pedals if the foot slips in an event of an accident.

14. The apparatus according to claim 13, wherein the fastening element includes an internal thread having a substantially centered hole.

15. The apparatus according to claim 13, further comprising a stiffening element.

16. The apparatus according to claim 15, wherein the stiffening element is a rib that extends between a rear side of the deflector plate and the fastening element.

17. An apparatus for protection of a lower extremity of a driver in an automobile having two pedals in a footwell, comprising:

a deflector plate;

a fastening element connected to the deflector plate that is configured to fasten the apparatus in the footwell of the automobile; and a centering element connected to the deflector plate, wherein the apparatus is disposable in the footwell of the automobile between the two pedals such that a foot resting on one of the two pedals is inhibited from a position behind the two pedals if the foot slips in an event of an accident.

18. The apparatus according to claim 17, wherein the centering element is tubular and at an end that is not attached to the deflector plate, an internal thread is provided having a substantially centered hole.

19. The apparatus according to claim 17, further comprising a stiffening element.

20. The apparatus according to claim 19, wherein the stiffening element is a rib that extends between a rear side of the deflector plate and the fastening element.

* * * * *